US012649417B1

(12) United States Patent
Austin

(10) Patent No.: US 12,649,417 B1
(45) Date of Patent: Jun. 9, 2026

(54) EYES-ON-ROAD CUP HOLDER MONITORING SYSTEMS AND METHODS

(71) Applicant: Toyota Motor Engineering & Manufacturing North America, Inc., Plano, TX (US)

(72) Inventor: Benjamin Piya Austin, Saline, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 29 days.

(21) Appl. No.: 18/961,312

(22) Filed: Nov. 26, 2024

(51) Int. Cl.
　B60Q 9/00 　　　(2006.01)
　B60R 25/102 　　(2013.01)

(52) U.S. Cl.
　CPC .............. B60Q 9/00 (2013.01); B60R 25/102 (2013.01)

(58) Field of Classification Search
　CPC ................................ B60Q 9/00; B60R 25/102
　See application file for complete search history.

(56) References Cited

U.S. PATENT DOCUMENTS

2017/0038892 A1*　2/2017　Ikeda ...................... G06V 40/28
2019/0251376 A1*　8/2019　Stoffel ...................... B60Q 3/76
2022/0203996 A1　　6/2022　Katz

FOREIGN PATENT DOCUMENTS

GB　　2597546 A　　2/2022
JP　　2008247090 A　　10/2008

OTHER PUBLICATIONS

Merged PE2E English Translation and Foreign Copy of WO-2024180731-A1 (Year: 2024).*

* cited by examiner

*Primary Examiner* — James J Lee
*Assistant Examiner* — Andrew Sang Kim
(74) *Attorney, Agent, or Firm* — Snell & Wilmer LLP

(57) ABSTRACT

Methods, systems, and apparatus for a vehicle cup monitoring system includes one or more input sensors, a vehicle occupant notification apparatus disposed in the vehicle, and a processor in communication with the input sensor(s) and the notification apparatus. The processor is configured to receive sensor data from the input sensor(s). The processor is configured to identify occupants of the vehicle and items such as cups in the vehicle using the sensor data. The processor is configured to assign a first cup to a first occupant of the vehicle based on activity of the occupants, characteristics of the occupants, and/or historical data. The processor is configured to notify a vehicle occupant using the vehicle occupant notification apparatus in response to the vehicle occupant reaching for a cup that is assigned to them or not assigned to them.

20 Claims, 9 Drawing Sheets

300

Receive sensor data from the in-cabin sensor — 302

Identify a first occupant of the vehicle, a second occupant of the vehicle, and a first cup that belongs to the first occupant of the vehicle using the sensor data — 304

Assign the first cup to the first occupant of the vehicle — 306

Send a warning signal to the vehicle occupant notification apparatus in response to the second occupant of the vehicle reaching for the first cup — 308

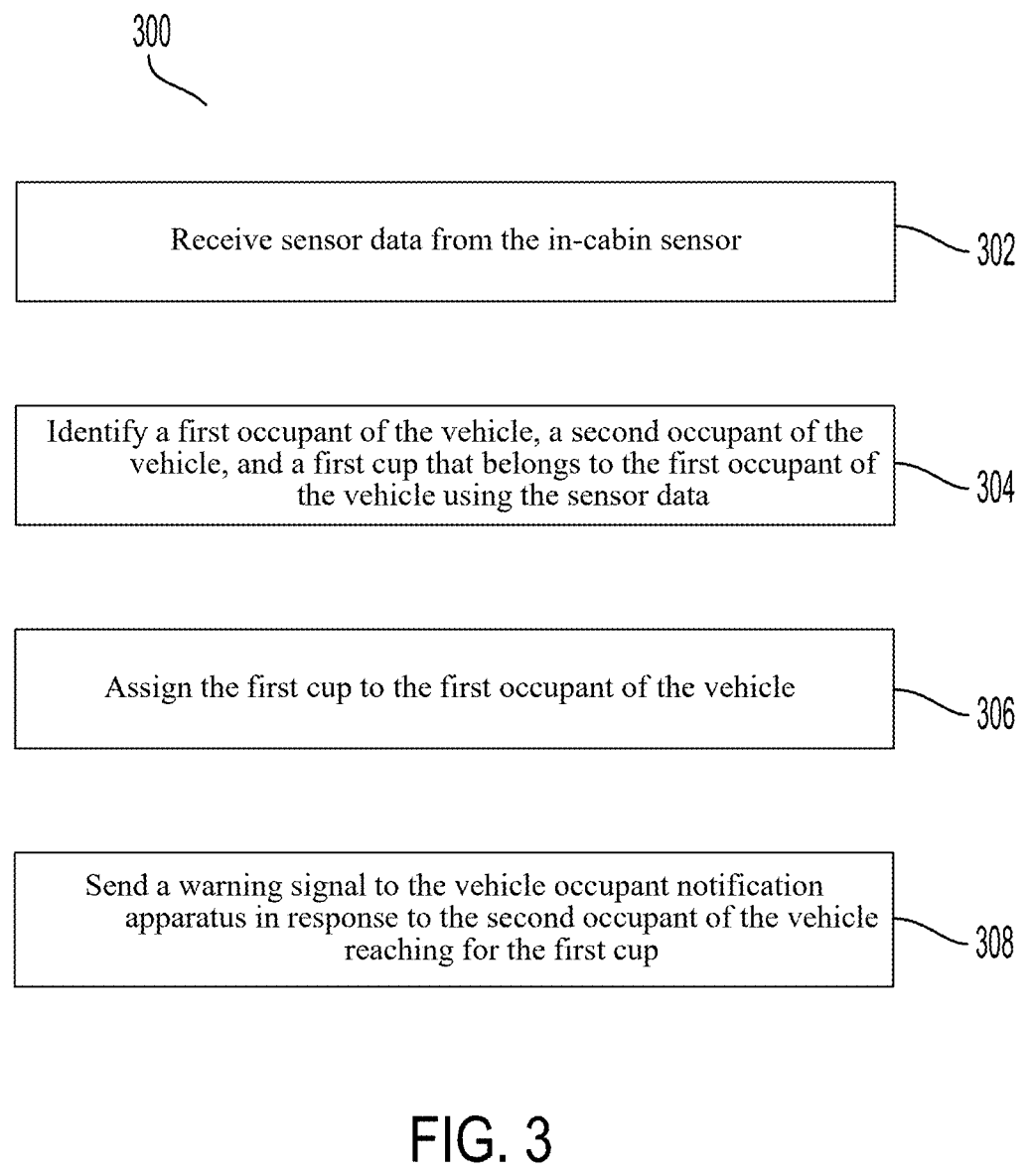

300

Receive sensor data from the in-cabin sensor ⎯ 302

Identify a first occupant of the vehicle, a second occupant of the vehicle, and a first cup that belongs to the first occupant of the vehicle using the sensor data ⎯ 304

Assign the first cup to the first occupant of the vehicle ⎯ 306

Send a warning signal to the vehicle occupant notification apparatus in response to the second occupant of the vehicle reaching for the first cup ⎯ 308

FIG. 3

EYES-ON-ROAD CUP HOLDER MONITORING SYSTEMS AND METHODS

BACKGROUND

Field

The present disclosure relates to vehicle occupant assistance systems and, more particularly, to systems and methods for cup monitoring in a vehicle.

Description of the Related Art

Cup holders for the convenience of drivers of vehicles enhance the ability of the driver to access beverages while driving. A driver and a front seat passenger can be in a vehicle, and both the driver and passenger may have cups in the center console. Determining which cup belongs to whom, particularly for the driver, may result in the driver taking his or her eyes off the road to look down at the cups.

Accordingly, it is desirable to provide systems, methods, and techniques for safely accessing beverages while driving.

SUMMARY

In general, one aspect of the subject matter described in this disclosure may be embodied in a vehicle occupant assistance system (or "cup monitoring system"). The cup monitoring system includes an in-cabin sensor configured to monitor an interior of a vehicle. The cup monitoring system includes a vehicle occupant notification apparatus. The cup monitoring system includes an electronic control unit (ECU) having a processor, the ECU is in electronic communication with the in-cabin sensor and the vehicle occupant notification apparatus. The cup monitoring system includes a tangible, non-transitory memory configured to communicate with the processor, the tangible, non-transitory memory having instructions stored thereon that, in response to execution by the processor, cause the ECU to perform various operations. The operations can include receiving, by the ECU, sensor data from the in-cabin sensor. The operations can include identifying, by the ECU, a first occupant of the vehicle, a second occupant of the vehicle, and a first cup that belongs to the first occupant of the vehicle using the sensor data. The operations can include assigning, by the ECU, the first cup to the first occupant of the vehicle. The operations can include sending, by the ECU, a notification signal to the vehicle occupant notification apparatus in response to the second occupant of the vehicle reaching for the first cup that belongs to the first occupant of the vehicle.

In one aspect, the subject matter may be embodied in a vehicle. The vehicle can include an in-cabin sensor configured to monitor an interior of the vehicle. The vehicle can include a vehicle occupant notification apparatus. The vehicle can include a cup monitoring system. The cup monitoring system can include an ECU having a processor, the ECU is in electronic communication with the in-cabin sensor and the vehicle occupant notification apparatus. The cup monitoring system can include a tangible, non-transitory memory configured to communicate with the processor, the tangible, non-transitory memory having instructions stored thereon that, in response to execution by the processor, cause the ECU to perform operations. The operations can include receiving, by the ECU, sensor data from the in-cabin sensor. The operations can include identifying, by the ECU, a first occupant of the vehicle, a second occupant of the vehicle, and a first cup that belongs to the first occupant of the vehicle using the sensor data. The operations can include assigning, by the ECU, the first cup to the first occupant of the vehicle. The operations can include sending, by the ECU, a notification signal to the vehicle occupant notification apparatus in response to the second occupant of the vehicle reaching for the first cup that belongs to the first occupant of the vehicle.

These and other aspects may optionally include one or more of the following features.

The in-cabin sensor can include a video camera, a radar sensor, a LiDAR sensor, a proximity sensor, and/or a microphone.

The ECU can assign the first cup to the first occupant of the vehicle in response to the first occupant of the vehicle taking a drink from the first cup.

The ECU can assign the first cup to the first occupant of the vehicle based on historical data of the first occupant.

The vehicle occupant notification apparatus can include a light, a speaker, a haptic device, a vehicle cluster, and/or a heads-up display.

The operations can further include listening, by the ECU, to words spoken by the first occupant of the vehicle that describes a characteristic of the first cup. The operations can further include recognizing, by the ECU, that the characteristic of the first cup matches the first cup, and the ECU assigns the first cup to the first occupant of the vehicle in response to recognizing that the characteristic of the first cup matches the first cup.

The operations can further include detecting a hand signature of the second occupant of the vehicle to determine that the second occupant of the vehicle is reaching for the first cup.

The operations can further include sending, by the ECU, the sensor data to a remote server for further processing. The operations can further include receiving, by the ECU, a list of identified objects from the remote server based on the sensor data. The ECU can use the list of identified objects to assign the first cup to the first occupant of the vehicle.

In one aspect, the subject matter may be embodied in a method of keeping track of a cup in a vehicle. The method can include receiving, by a processor, sensor data from an in-cabin sensor. The method can include identifying, by the processor, a first occupant of the vehicle, a second occupant of the vehicle, and a first cup that belongs to the first occupant of the vehicle using the sensor data. The method can include assigning, by the processor, the first cup to the first occupant of the vehicle. The method can include sending, by the processor, a notification signal to a vehicle occupant notification apparatus in response to the second occupant of the vehicle reaching for the first cup that belongs to the first occupant of the vehicle.

These and other aspects may optionally include one or more of the following features.

The method can further include detecting a hand signature of the second occupant of the vehicle to determine that the second occupant of the vehicle is reaching for the first cup.

The vehicle occupant notification apparatus can include a light, a speaker, a haptic device, a vehicle cluster, and/or a heads-up display.

The method can further include receiving, by the processor, home security sensor data from a home security system, and the processor uses the home security sensor data to assign the first cup to the first occupant of the vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

FIG. 3 is a flow diagram of an example process for keeping track of a cup within a vehicle according to various aspects of the invention.

DETAILED DESCRIPTION

Figure 1A:
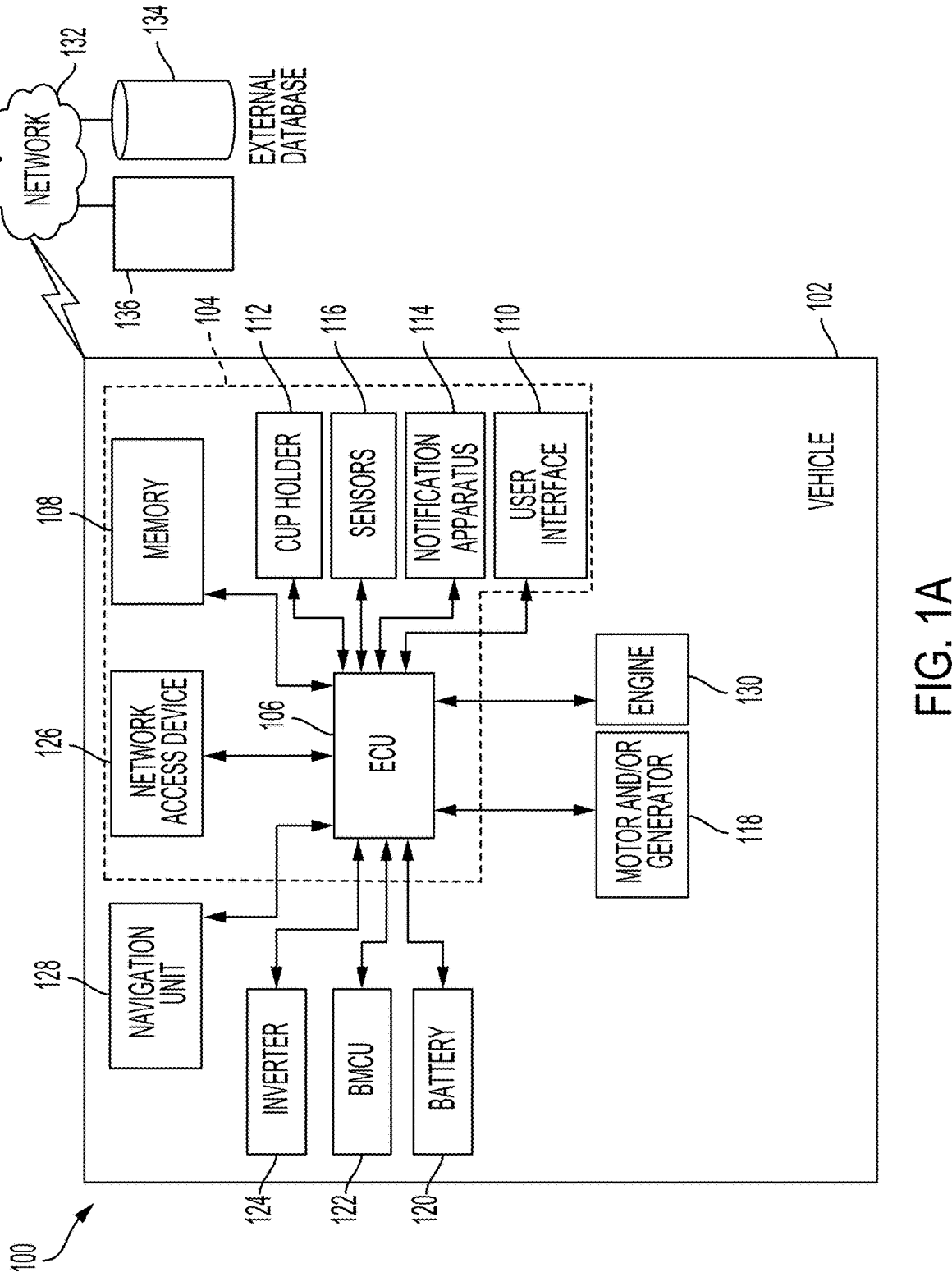
FIG. 1A is a block diagram of an example vehicle occupant assistance system according to various aspects of the invention.

Disclosed herein are systems, methods, devices, and/or vehicles for implementing a cup tracking system that detects and tracks cups belonging to different vehicle occupants and notifies a vehicle occupant if they are reaching for the wrong cup. Aspects and/or embodiments are directed to identifying which cup belongs to who and providing a notification to the vehicle occupant if they reach for the wrong cup, which allows a vehicle occupant (e.g., a driver) to keep their eyes on the road while reaching for their cup.

The cup tracking system may utilize one or more input sensors (e.g., microphone, radar, LiDAR, camera, proximity, etc.) to monitor the location of one or more cups. The input sensors are further used to monitor location, speed, and/or hand signature of a user to detect when a user is reaching for a particular cup. The cup tracking system may utilize one or more vehicle occupant notification apparatus (e.g., vehicle cluster, head-up display (HUD), a light, a speaker, a haptic device, etc.) to provide feedback to the vehicle occupant in a manner that allows the vehicle occupant to keep their eyes on the road (i.e., to maintain a safe driving gaze). The cup tracking system can notify a vehicle occupant when they are reaching for, or grabbing, the wrong cup.

In various aspects, a cup tracking system can help prevent the spread of illness between multiple passengers in a vehicle, for example, a driver and a front seat passenger, who may both have cups in the center console. A vehicle cup tracking system can identify information about the driver/passenger(s) to determine if someone may be sick or becoming sick. The system can use information from the cloud (e.g., a passenger's phone may have on the calendar a doctor appointment, a text that says "I'm feeling well today", or physiological data linked to a smartwatch shows that the driver/passenger has been coughing/sneezing) or onboard, in-vehicle physiological sensors (e.g., body temperature, heartrate, breathing patterns, etc.) or imaging devices (e.g., cameras that use ML to determine from a person's facial characteristics or posture if they might be ill) to inform the system if the driver or passenger may be ill based on historical data for that person and using general population averages and biomarkers. If the system does determine that the person is sick or estimates that the person is becoming sick, the system engages a logic such that if the person in the passenger seat is sick, the cup holder glows red if the driver reaches for the sick passenger's cup. Alternatively, if the passenger is healthy but the driver is sick, the cup holder glows red if the passenger reaches for the sick driver's cup. The red glow is used to indicate "Do not drink this cup" and is especially helpful for the driver, who can see this light in their periphery when their eyes are on the road. The system (using in-vehicle cameras and other imaging sensors) keeps track of who's drink is in which cup holder. Thus, the system can help to prevent the unnecessary spread of illness. The system can also be used by someone who has a personal preference to never share liquids with another person (i.e., the system can function to eliminate unwanted spreading of germs regardless of whether the system is aware of any present illnesses). In this manner, the cup tracking system tends to eliminate unwanted spreading of germs.

FIG. 1A is a block diagram of a vehicle occupant assistance system 100 (also referred to as a cup monitoring system), in accordance with various aspects. The cup monitoring system 100 may include a cup monitoring apparatus 104 that may retrofit, couple to, include, or be included within a vehicle 102. The cup monitoring apparatus 104 may be within, coupled to, or otherwise connected to the vehicle 102 and/or connected to other vehicle components. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of electric/hybrid vehicle. Other examples of vehicles include bicycles, trains, planes, or boats, and any other form of conveyance that is capable of transportation. The vehicle 102 may be semi-autonomous or autonomous.

The cup monitoring system 100 can be configured to keep track of one or more cups within the vehicle 102. The cup monitoring system 100 monitors user gestures and/or activity as well as cup location within the vehicle 102 and can notify a vehicle occupant when they reach for the wrong cup. The cup monitoring system 100 can notify the vehicle occupant whether they are reaching for the correct cup using various notification apparatus 114 (e.g., haptic feedback, auditory methods, illumination, or messaging. This provides for a cupholder system that allows a user (e.g., a driver) to keep their eyes on the road rather than looking down to retrieve an object held in the vehicle's cupholder.

The cup monitoring apparatus 104 may include one or more processors, such as an electronic control unit (ECU) 106 or other processor and a memory 108. The cup monitoring apparatus 104 may include or be coupled to other vehicle components including a user interface 110, a cup holder 112, the notification apparatus 114, one or more sensors 116, and/or a network access device 126. In some implementations, the cup monitoring apparatus 104 may include or be coupled to other components of the vehicle 102, such as a motor and/or generator 118, a battery 120, a battery management control unit 122, an inverter 124, a navigation unit 128, and/or an engine 130.

The ECU 106 may be implemented as a single ECU or as multiple ECUs. The ECU 106 may be electrically coupled to some or all of the other components within the vehicle 102, such as the user interface 110, the cup holder 112, the notification apparatus 114, the one or more sensors 116, the motor and/or generator 118, the engine 130, the battery 120, the inverter 124, the battery management control unit (BMCU) 122, the memory 108, the network access device 126, and/or navigation unit 128. The ECU 106 may include one or more processors or controllers specifically designed for monitoring user gestures and/or activity as well as cup location within the vehicle 102. The ECU 106 may include one or more processors or controllers specifically designed for notifying a vehicle occupant when they reach for the wrong cup. The ECU 106 may be coupled to the memory 108.

The memory 108 may be coupled to the ECU 106 and store instructions that the ECU 106 executes. The memory 108 may include one or more of a Random Access Memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106 or other processor. For example, the memory 108 can store user history data, such as historical data for one or more vehicle users. Example historical data includes cup holder usage for one or more users, cup usage for one or more user, signature look of a user's hand when reaching for a cup, or any other historical data that may be used for identifying a vehicle occupant and/or assigning a cup to the vehicle occupant.

The cup monitoring apparatus 104 may include a user interface 110. The cup monitoring apparatus 104 may display one or more notifications and/or alerts using the user interface 110 and/or the notification apparatus 114. The one or more notifications may notify the user of a cup assignment. The one or more notification may notify the user of whether or not a cup for which the user is reaching, or already reached, belongs to the user. The user interface 110 may include an input/output device that receives user input, such as a user interface element, a button, a dial, a microphone, a keyboard, or a touch screen, and/or provides output, such as a display, a speaker, an audio and/or visual indicator, or a refreshable braille display. The user interface 110 may receive user input that may include configuration settings for one or more user preferences that indicate a cup preference, a cup holder preference, a notification preference, or other user preferences related to the cup monitoring system 100.

The cup monitoring apparatus 104 may include the cup holder 112. The cup holder 112 can be configured to receive one or more cups and/or other items (e.g., phone, wallet, keys, etc.). The cup holder 112 can secure the cups or other items in place while not in use by the vehicle occupants.

The cup monitoring apparatus 104 may include a notification apparatus 114. The notification apparatus 114 can include a light, a speaker, a vehicle cluster (e.g., located in the dash of the vehicle in front of the driver), a HUD, a haptic feedback device, or any other suitable method of notifying a user of a cup status that allows the user to maintain a safe driving gaze.

Figure 1B:
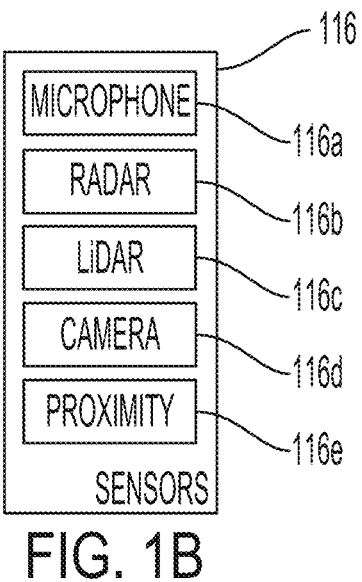
FIG. 1B is a block diagram of example in-cabin sensors for the vehicle occupant assistance system according to various aspects of the invention.

The cup monitoring apparatus 104 may include one or more sensors 116. With momentary reference to FIG. 1B, the one or more sensors 116 can include a microphone 116a, a radar 116b, a LiDAR 116c, a video camera 116d, and/or a proximity sensor 116e. The microphone 116a can receive audio data from a user that can include user preferences or conversation indicating what a user is drinking. The radar 116b can receive radar data that can be used to track objects and/or user gestures. The LiDAR 116c can receive LiDAR data that can be used to track objects and/or user gestures. The video camera 116d can receive video or image data that can be used to track objects and/or user gestures. The video camera 116d can be an infrared video camera for capturing image data in low light conditions. The proximity sensor 116e can receive distance and/or speed data of an object approaching a cup holder.

With reference again to FIG. 1A, the motor and/or generator 118 may convert electrical energy into mechanical power, such as torque, and may convert mechanical power into electrical energy, such as via regenerative braking. The motor and/or generator 118 may be coupled to the battery 120 via the inverter 124. The motor and/or generator 118 may convert the energy from the battery 120 into mechanical power, and may provide energy back to the battery 120, for example via regenerative braking. The inverter 124 may convert direct current (DC) from the battery 120 into alternative current (AC) for the motor and/or generator 118 to power or move the wheels of the vehicle 102. The inverter 124 may convert the AC from the motor and/or generator 118 and that is produced via regenerative braking to DC to store in the battery 120. The wheels of the vehicle 102 may create torque to move the motor and/or generator 118 to provide the AC to the inverter 124 to convert into DC to be stored in the battery 120, e.g., when coasting or decelerating. The inverter 124 may control the variable regenerative braking torque of the electric motor that decelerates the vehicle 102 and the corresponding variable deceleration drive force.

In some implementations, the vehicle 102 may include one or more additional power generation devices such as the engine 130 or a fuel cell stack (not shown). The engine 130 combusts fuel to provide power instead of and/or in addition to the power supplied by the motor and/or generator 118.

The battery 120 may be coupled to the motor and/or generator 118 and may provide electrical energy to and receive electrical energy from the motor and/or generator 118. The battery 120 may include one or more rechargeable batteries.

The BMCU 122 may be coupled to the battery 120 and may control and manage the charging and discharging of the battery 120. The BMCU 122, for example, may measure, using battery sensors, parameters used to determine the state of charge (SOC) of the battery 120. The BMCU 122 may control the battery 120 to maintain a reserve power explicitly for providing a sudden burst of electrical energy to be converted into power for the transmission to drive or move the multiple wheels of the vehicle 102.

The cup monitoring system 100 may include a network access device 126. The network access device 126 may be coupled to or included within the cup monitoring apparatus 104. The network access device 126 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 126 may transmit data to and receive data from the entities and/or components via a network 132. The network 132 may be a Dedicated Short-Range Communication (DSRC) network, a local area network (LAN), a wide area network (WAN), a cellular network, the Internet, or combination thereof, that connects, couples and/or otherwise communicates among the multiple entities.

The cup monitoring system 100 may include or be coupled to an external database 134, such as via the network 132. A database is any collection of pieces of information that is organized for search and retrieval, such as by a computer or a processor, and the database may be organized in tables, schemas, queries, reports, or any other data structures. A database may use any number of database management systems. The external database 134 can store user history data. The external database 134 may include a third-party server or website that stores or provides information. The information may include real-time information, periodically updated information, or user-inputted information. A server may be a computer or a processor in a network that is used to provide services, such as accessing files or sharing peripherals, to other computers in the network.

The cup monitoring system 100 may include or be coupled to a remote server 136, such as via the network 132. The remote server 136 can include or be in communication with a machine learning model.

The cup monitoring system 100 may include a navigation unit 128. The navigation unit 128 may be integral to the vehicle 102 or a separate unit coupled to the vehicle 102. In some implementations, the vehicle 102 may include a Global Positioning System (GPS) unit (not shown) for detecting location data and date/time information instead of the navigation unit 128. In that regard, the ECU 106 may perform the functions of the navigation unit 128 based on data received from the GPS unit. At least one of the navigation unit 128 or the ECU 106 may predict or propose a route set that includes a starting location and a destination location. The navigation unit 128 or the ECU 106 may perform navigation functions. Navigation functions may include, for example, route and route set prediction, providing navigation instructions, and receiving user input such as verification of predicted routes and route sets or destinations.

The navigation unit 128 may provide and obtain navigational map information. The navigational map information may include a timestamp, a current location, a direction of travel, one or more road features, a starting location, a destination location and/or a route between the starting location or current location and the destination location of the vehicle 102 and may include a memory for storing route data. The navigation unit 128 may receive data from other sensors capable of detecting data corresponding to location information. For example, the other sensors may include a gyroscope or an accelerometer.

Figure 2:
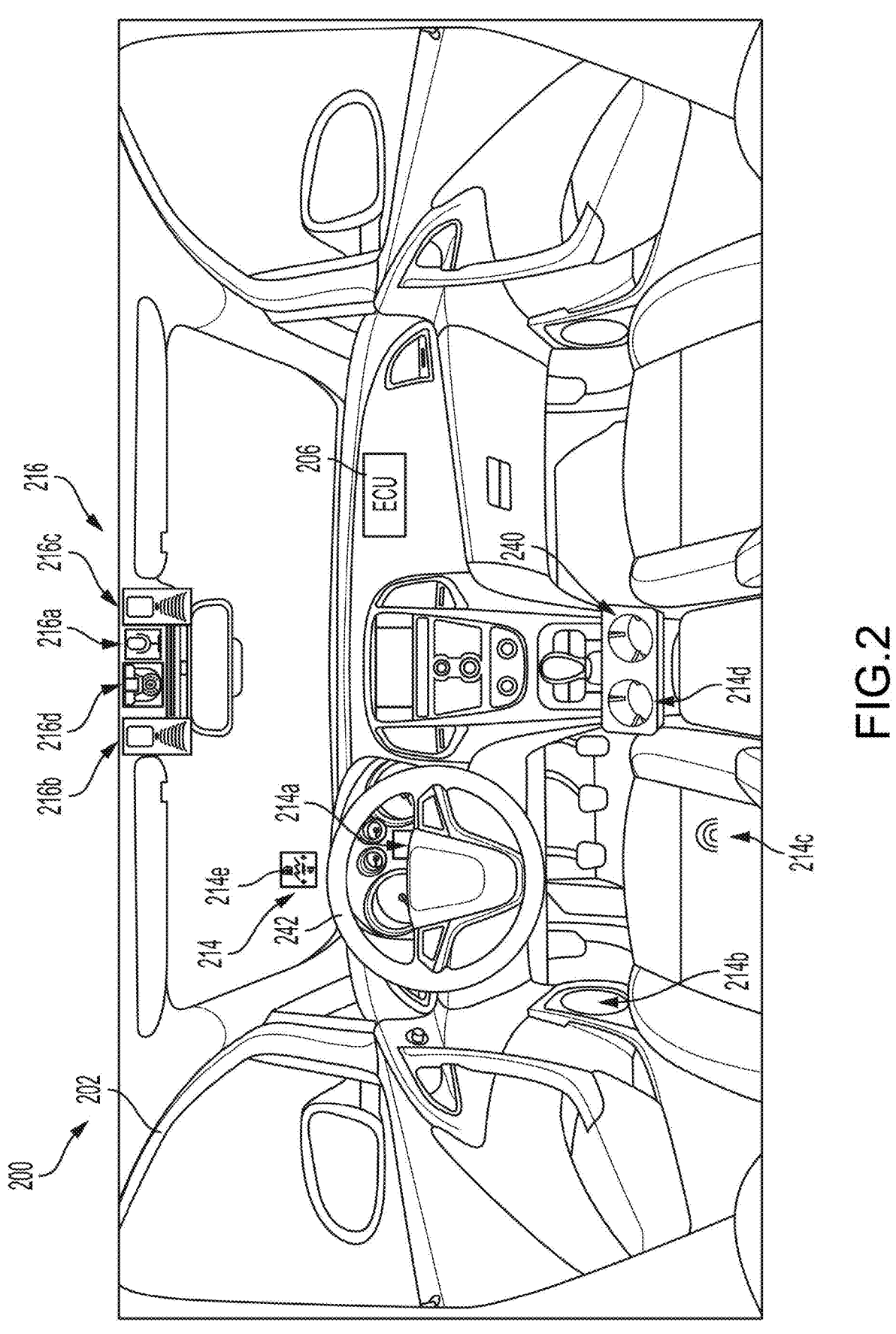
FIG. 2 is a perspective view of an example cabin of a vehicle equipped with a vehicle occupant assistance system according to various aspects of the invention.

FIG. 2 is a perspective of an interior of a vehicle 202 equipped with an occupant assistance system 200 (also referred to as a cup monitoring system), in accordance with various aspects. In various aspects, the occupant assistance system 200 is similar to the occupant assistance system 100 of FIG. 1A. The occupant assistance system 200 generally includes an ECU 206 in electronic communication with one or more input sensors 216. The input sensors 216 can include a microphone 216a, a radar sensor 216b, a LiDAR sensor 216c, and/or a camera 216d. The input sensors 216 can be located in a cab of the vehicle 202 and/or can be inward facing so as to view and/or monitor vehicle occupants in the vehicle cab as well as items in a cup holder 240 of the vehicle 202. The input sensors 216 can send sensor data to the ECU 206 while the vehicle 202 is turned on.

The vehicle 202 can include one or more notification apparatus 214 such as a cluster display 214a in a dash of the vehicle 202, a speaker 214b, a haptic output device 214c, a light 214d (see also FIG. 4), and/or a HUD 214e, for example. The speaker 214b can be part of the vehicle's multimedia system. The haptic output device 214c can include a motor configured to rotate to cause a portion of a user's seat to vibrate. The haptic output device 214c could also be located in the steering wheel 242.

The cup holder 240 can be located in a center console of the vehicle 202. The cup holder 240 can be configured to hold a plurality of cups and/or other items for occupants of the vehicle 202.

FIG. 3 is a flow diagram of a method 300 for keeping track of a cup within the vehicle 202. One or more computers or one or more data processing apparatuses, for example, the ECU 206 of the cup monitoring system 200, appropriately programmed, may implement the method 300. For ease of description, the method 300 is described below with reference to FIG. 2. The method 300 of the present disclosure, however, is not limited to use of the exemplary cup monitoring system 200 of FIG. 2.

In step 302, the method 300 includes receiving sensor data at the ECU 206 from one or more in-cabin sensors (e.g., the one or more input sensors 216). The sensor data can be audio data, radar data, LiDAR data, and/or image data.

In step 304, the method 300 includes identifying a first occupant of the vehicle 202 using the sensor data. The method 300 includes identifying a second occupant of the vehicle 202 using the sensor data. The method 300 includes identifying a first cup that belongs to the first occupant of the vehicle 202 using the sensor data. For example, the ECU 206 can identify a driver and a passenger of the vehicle 202. Depending on the sensor 216 being used, the ECU 206 can process the sensor data to determine a position of a person and/or an object.

When the microphone 216a is being used, the ECU 206 can analyze audio data to determine a location of one or more persons (e.g., in the driver seat or the passenger seat) and/or a cup that belongs to a person (e.g., the driver can order a particular beverage at a drive-through window or can comment aloud on a beverage that they have or are drinking). In various aspects, the microphone 216a can be used to temporarily disable the cup tracking system. For example, one vehicle occupant can ask another vehicle occupant if they can have a sip of their drink, in which case the cup monitoring system may temporarily disable the notification feature that a user is reaching for the wrong cup.

When the radar 216b is being used, the ECU 206 can estimate or detect one or more persons and/or items, a position of the person(s) or item(s), and/or motion of the person(s) and/or item(s) by transmitting radio waves and analyzing the echoes that bounce back.

When the LiDAR 216c is being used, the ECU 206 can estimate or detect the pose of one or more persons, for example by receiving a point cloud from the LiDAR sensor 216c. The point cloud can include a plurality of points representing positions of objects relative to the LiDAR sensor 216c. The ECU 206 can process the point cloud to produce a voxelized frame including a plurality of voxels. The ECU 206 can process the voxelized frame using a deep neural network to determine one or more persons or items (e.g., a cup) relative to the LiDAR sensor 216c and/or a pose for each of the one or more persons.

When the camera 216d is being used, the ECU 206 can use image-recognition techniques to detect one or more persons and/or items in the vehicle 202. In various aspects, the ECU 206 can include and/or be in communication with a trained image recognition model. The model can be training by inputting training sample images into an image recognition training model. In this regard, the ECU 206 can use image-recognition techniques for detecting the one or more persons or items and/or for detecting motion or gestures of the one or mor persons.

In step 306, the method 300 includes assigning the first cup to the first occupant of the vehicle 202. For example, the ECU 106 can detect that the first person took a drink from the first cup. The ECU 106 can assign the first cup to the first occupant of the vehicle 202 in response to the ECU 106 detecting that the first person took a drink from the first cup. In this regard, the first moment of establishing whose drink belongs to who can be when one of the occupants take a first drink and the cup monitoring system 200 can track where the first occupant places the first drink in the cup holder. The cup monitoring system 200 can continue to track the location of the first drink each time someone removes the first drink from the cup holder. In various aspects, the ECU 106 can assign a cup to a user based on the location of the cup in the vehicle (e.g., the cup closest to the driver can be assigned to the driver). In various aspects, the ECU 106 can assign a cup to a user based on historical data (e.g., the driver always places her cup in the left cup holder and so the ECU 106 assumes the cup located in the left cup holder belongs to the driver). Assigning a cup to an occupant can include storing data that links the assigned cup to the occupant, for example by storing data that links the occupant's unique identifier (like a username or account number) with the cup's identifier within a database, effectively creating a relationship between the two entities.

In step 308, the method 300 includes sending a notification signal to the vehicle occupant notification apparatus 214 in response to the second occupant of the vehicle reaching for the first cup. For example, the ECU 206 can detect that the second occupant is reaching for, or is grabbing, the first cup. In response to a non-assigned occupant reaching for, or grabbing, the first cup, the ECU 206 can send a notification signal to the occupant notification apparatus 214 (e.g., the vehicle cluster display 214a, the speaker 214b, the haptic output device 214c, the light 214d, the HUD 214e, or any other suitable occupant notification apparatus) to notify the occupants of the vehicle that the second occupant is about to drink or is reaching for the incorrect cup. In this manner, the ECU 206 can prevent users from reaching for, grabbing, or drinking the wrong cup, which can prevent germs from spreading between different occupants and/or prevent confusion about who's cup belongs to whom.

Figure 4:
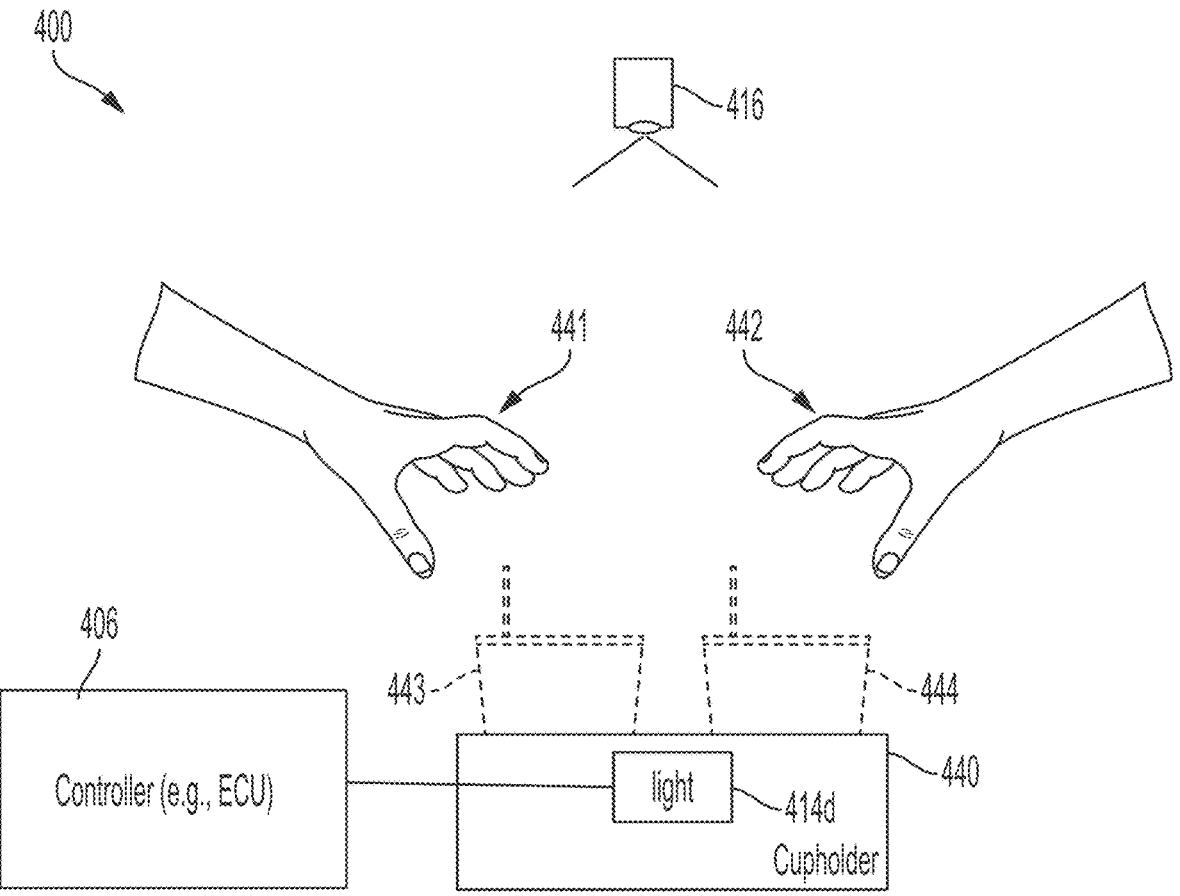
FIG. 4 is a schematic view of the example vehicle occupant assistance system having a light as a notification apparatus according to various aspects of the invention.

FIG. 4 is a schematic view of an occupant assistance system 400 (also referred to as a cup monitoring system), in accordance with various aspects. In various aspects, the occupant assistance system 400 is similar to the occupant assistance system 100 of FIG. 1A. In various aspects, the occupant assistance system 400 is similar to the occupant assistance system 200 of FIG. 2. The occupant assistance system 400 generally includes an ECU 406 in electronic communication with one or more input sensors 416. The occupant assistance system 400 can further include a light 414d. The light 414d can be within, coupled to, or otherwise connected to the cup holder 440.

With continued reference to FIG. 4, step 306 of FIG. 3 can include assigning the first cup 443 to the first occupant 441 (e.g., a driver) of the vehicle. The ECU 406 can further assign the second cup 444 to the second occupant 442 (e.g., a passenger) of the vehicle. The ECU 406 can use the one or more input sensors 416 to keep track of the positions of the first and second cups 443, 444.

With continued reference to FIG. 4, in response to the first occupant 441 reaching for the wrong cup (e.g. second cup 444), step 308 of FIG. 3 can include sending a signal to the light 414d which causes the light 414d to light up. In various aspects, the light 414d is an LED light and the signal can cause the light 414d to illuminate to a predetermined color, for example red. In this manner, the first occupant 441 (e.g., the driver) can be informed that he or she is reaching for the wrong cup. Similarly, in response to the second occupant 442 reaching for the wrong cup (e.g., the first cup 443), step 308 of FIG. 3 can include sending a signal to the light 414d which causes the light 414d to light up in a predetermined color (e.g., red). In response to the second occupant 442 reaching for the correct cup (e.g., the second cup 444), the ECU 406 can cause the light 414d to illuminate to a second predetermined color (e.g., green) or the light 414d can remain off. In various aspects, the light 414d can extend around a perimeter of the cup holder 440 so that the driver can see the light illuminating from the light 414d in their visual periphery.

Figure 5:
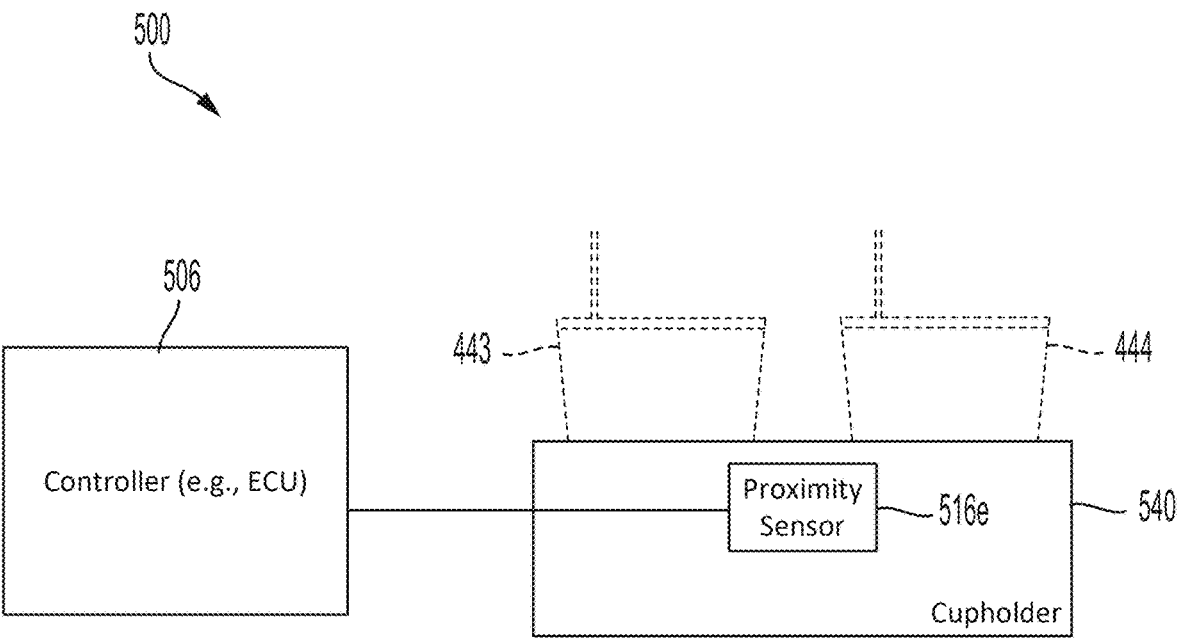
FIG. 5 is a schematic view of an example vehicle occupant assistance system having a proximity sensor as an in-cabin sensor according to various aspects of the invention.

FIG. 5 is a schematic view of an occupant assistance system 500 (also referred to as a cup monitoring system), in accordance with various aspects. In various aspects, the occupant assistance system 500 is similar to the occupant assistance system 100 of FIG. 1A. In various aspects, the occupant assistance system 500 is similar to the occupant assistance system 200 of FIG. 2. In various aspects, the occupant assistance system 500 is similar to the occupant assistance system 400 of FIG. 4. The occupant assistance system 500 generally includes an ECU 406 in electronic communication with an input sensor including a proximity sensor 516e. The proximity sensor 516e can be within, coupled to, or otherwise connected to the cup holder 540.

The proximity sensor 516e can be a sensor for detecting the distance and/or speed of an object approaching the cup holder 540. The proximity sensor 516e can be a pre-touch sensor manufactured by OMRON Corporation or the like. For example, the proximity sensor 516e can be configured to detect the distance and/or speed of a user's hand approaching the cup holder 540. The proximity sensor 516e can be configured to send sensor data (e.g., distance and/or speed data) to the ECU 506. The ECU 506 can use the sensor data from the proximity sensor 516e to detect a vehicle occupant reaching for the first cup 443 and/or the second cup 444. In this manner, the ECU 506 can determine which occupant is reaching (i.e., the driver or the passenger) and for which cup (i.e., the first cup 443 or the second cup 444).

In various aspects, the proximity sensor 516e can operate together with an occupant notification apparatus (e.g., the light 414d of FIG. 4 and/or any other notification apparatus such as the notification apparatus 114 of FIG. 1A). For example, as the ECU 506 tracks the distance of a user's hand from the cup holder 540, the ECU 506 can cause the light (e.g., the light 414d of FIG. 4) to increase in brightness as the user's hand moves closer to the cup holder 540 and/or the first cup 443. The ECU 506 can cause the light to change color when the driver touches the cup 443. In various aspects, an indicator light can be shown in a vehicle cluster and/or a HUD to provide proximity information to the driver. In various aspects, haptic feedback can be provided in a driver's seat and/or steering wheel to let the driver know that they are getting near or touching the cup 443. In this manner, the driver can keep her eyes on the road to promote safety.

In various aspects, with combined reference to FIG. 4 and FIG. 5, the occupant assistance system 500 can utilize the cup holder light 414d to indicate whether or not it is a safe time for the occupant to grab the cup 443. For example, if the vehicle is in heavy traffic at a high rate of speed (e.g., 70 mph) and the occupant reaches for the cup 443, the light 414d could turn red to indicate that it is not safe to take a drink at this time considering the current traffic situation. In various aspects, if the vehicle is in a zero-traffic environment at 70 mph and using adaptive cruise control (ACC), and the occupant reaches for the cup 443, the light 414d could turn green to indicate that is safe to take a drink at this time. In this way, the occupant assistance system 500 takes into account the surrounding traffic conditions, use of various ADAS features (such as ACC or lane centering assist (LCA)) and could also take into account driver state (e.g., the driver monitoring system (DMS) indicates that the driver is drowsy and should keep both hands on the wheel rather than use one hand to grab the cup 443). In this regard, the ECU 506 can take into account various vehicle and/or driving conditions to alert the driver whether or not it is safe to take a drink using an occupant notification apparatus, such as the light 414d or other notification apparatus described herein.

Figure 6:
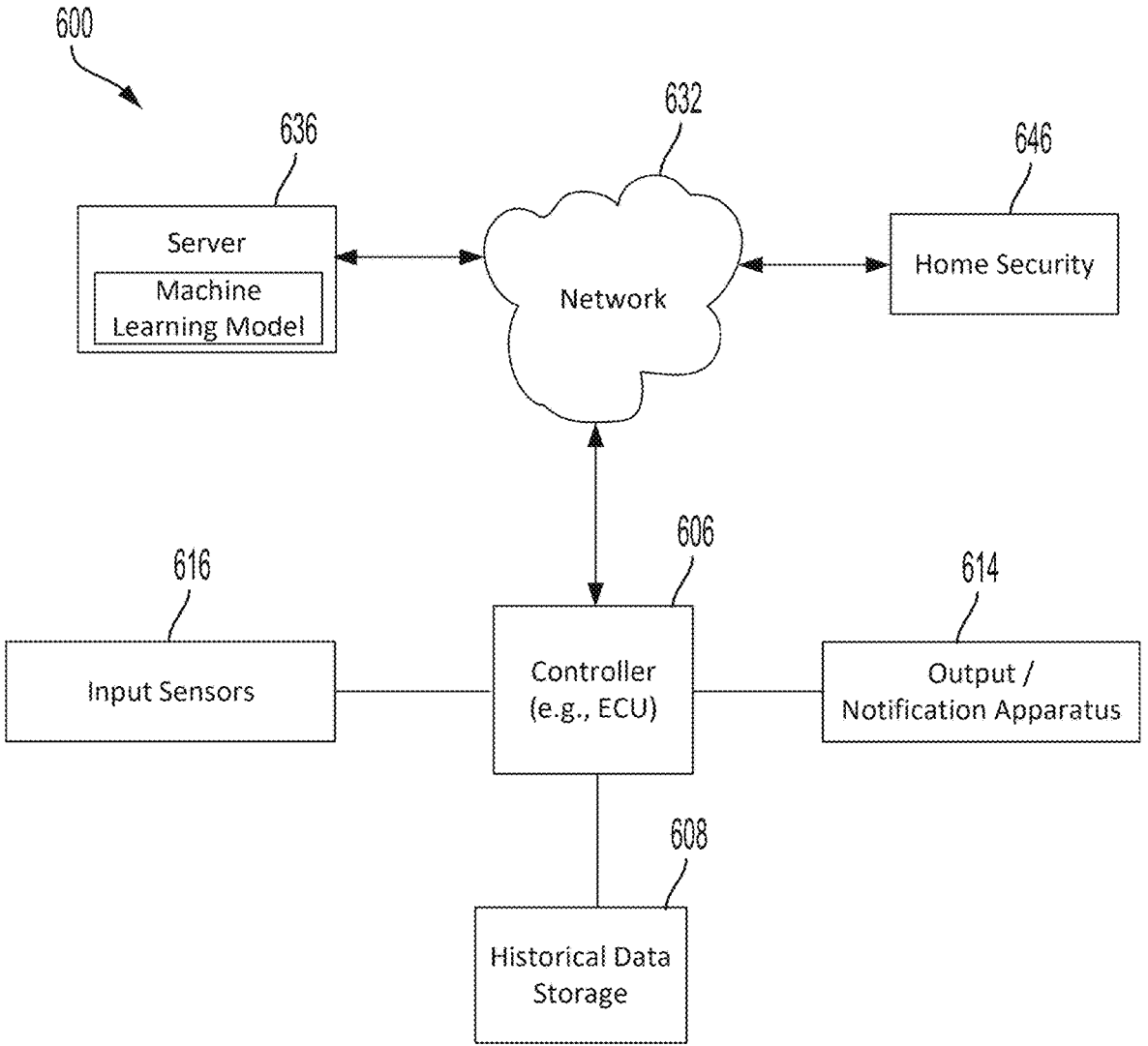
FIG. 6 is a block diagram of an example vehicle occupant assistance system according to various aspects of the invention.

FIG. 6 is a block diagram of a vehicle occupant assistance system 600 (also referred to as a cup monitoring system), in accordance with various aspects. In various aspects, the occupant assistance system 600 is similar to the occupant assistance system 100 of FIG. 1A. In various aspects, the occupant assistance system 600 is similar to the occupant assistance system 200 of FIG. 2. In various aspects, the occupant assistance system 600 is similar to the occupant assistance system 400 of FIG. 4. In various aspects, the occupant assistance system 600 is similar to the occupant assistance system 500 of FIG. 5.

The cup monitoring system 600 generally includes an ECU 606 in electronic communication with one or more input sensors 616, one or more notification apparatus 614, and a network 632. The input sensors 616 can be similar to sensors 116 of FIG. 1A in various aspects. The notification apparatus 614 can be similar to the notification apparatus 114 of FIG. 1A in various aspects. The network 632 can be similar to the network 132 of FIG. 1A in various aspects. The ECU 606 can further be in electronic communication with a memory 608. The memory 608 can be a data storage device configured to store historical data, such as user data for example. The ECU 606 can further be in electronic communication with a remote server 636 via the network 632. The remote server 636 can be similar to the remote server 136 of FIG. 1A in various aspects.

The ECU 606 can further be in electronic communication with a home security system 646 via the network 632. The home security system 646 can include one or more cameras and one or more microphones.

Figure 7:
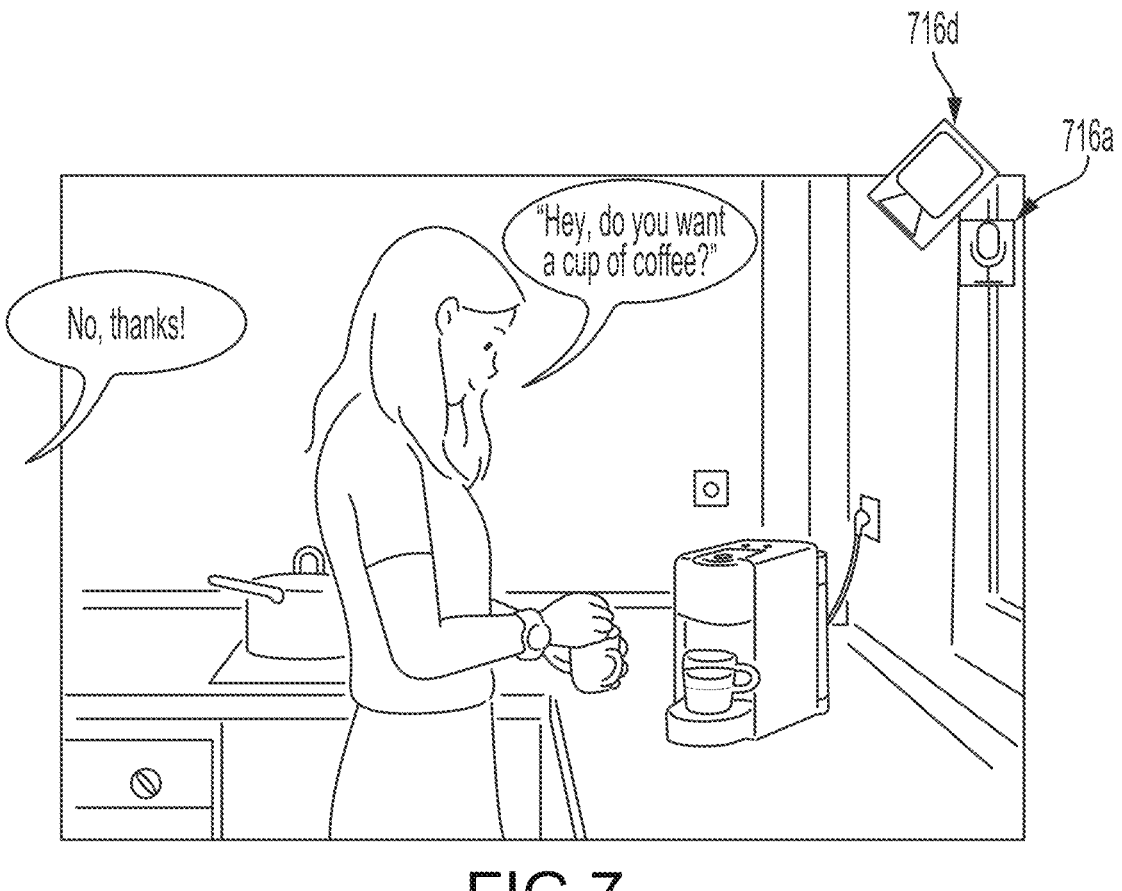
FIG. 7 is a schematic view of an example home security system in communication with a vehicle occupant assistance system according to various aspects of the invention.

FIG. 7 is a schematic via of an example home security system 746. In various aspects, the home security system 646 of FIG. 6 can be similar to the home security system 746. The home security system 746 can include one or more cameras 716d and one or more microphones 716a.

With combined reference to FIG. 6 and FIG. 7, the ECU 606 can receive image data from the camera 716d. The ECU 606 can use image recognition techniques to see which cup each user is drinking from and/or preparing in the home and/or in the office. The ECU 606 can assign these cups to their respective users. In this manner, the ECU 606 can know which cup belongs to who after the users enter the vehicle with their cups. The ECU 606 can track where the users place their cups in the car, for example by using image recognition techniques. An image of a user and the user's cup can be saved in memory 608.

The ECU 606 can receive audio data from the microphone 716a. The ECU 606 can use the audio data, for example using speech-to-text techniques, to determine what cups each user has. For example, the microphone 716a can capture a conversation between a husband and wife where the wife asks the husband whether he wants a cup of coffee. The husband can answer in the negative (i.e., "no, thanks"). In this manner, the ECU 606 can know that the husband is not drinking from the coffee cup after the couple enters the vehicle. The ECU 606 can use image-recognition techniques to know which cup is the coffee cup by capturing a picture of the cups in the cup holder after the users enter the vehicle.

The remote server 636 can include a machine learning model which can be used to recognize characteristics of various cups (e.g., a mug with a handle, a soft drink cup, logos on the cup, cups made by different manufacturers, etc.). The ECU 606 can send sensor data from the input sensors 616 to the remote server 636 via the network 632. The machine learning model can be used to distinguish between, and/or identify, various types of cups (e.g., a coffee cup, a soft drink, different brands, etc.). For example, the ECU 606 may know that a user ordered a soft drink at a drive-through window (e.g., by listening to the driver's conversation). The ECU 606 can use the machine learning model and a video camera to determine which drink in the vehicle has characteristics that matches the drink from the conversation. The ECU 606 can receive a list of identified objects (e.g., vehicle occupants, cups, etc.) from the remote server 636. The ECU 606 can use the list of identified objects to assign a cup to an occupant of the vehicle. In this regard, the remote server 636 can perform certain aspects of identifying objects (e.g., occupants and/or cups) in the vehicle.

In various aspects, the ECU 606 can assign a cup to a vehicle occupant based on characteristics of the vehicle occupant. For example, the ECU 606 can recognize a woman wearing a certain color lipstick. The ECU 606 and/or the machine learning model can use image-recognition techniques to identify a cup with similar color lipstick markings.

In various aspects, the ECU 606 can use historical data to assign a drink to a particular vehicle occupant. For example, the ECU 606 can know based on historical data that a first vehicle occupant (e.g., a husband) never drinks tea, but a second user (e.g., a wife) usually drinks tea. The ECU 606 can use image-recognition techniques to identify a cup with tea inside and assign it to the second vehicle occupant.

In various aspects, the ECU 606 can default to assuming that the driver's cup is in the cupholder that is typically used by the driver (e.g., using historical data in the memory 608). In this regard, user profiles can be stored in memory 608 with a cup holder location typically used by the user.

In various aspects, the ECU 606 can assign a particular cup to a particular vehicle occupant. The ECU 606 can keep track of which cups are used by various vehicle occupants over time. When multiple cups are placed in the vehicle, the ECU 606 can determine whether any of the cups have been previously assigned to a vehicle occupant. The more the vehicle occupant uses a particular cup, the more confidence the cup monitoring system 600 may have that that cup belongs to the particular vehicle occupant. In this regard, user profiles can be stored in memory 608 with a list of cups previously used by the user.

Figure 8A:
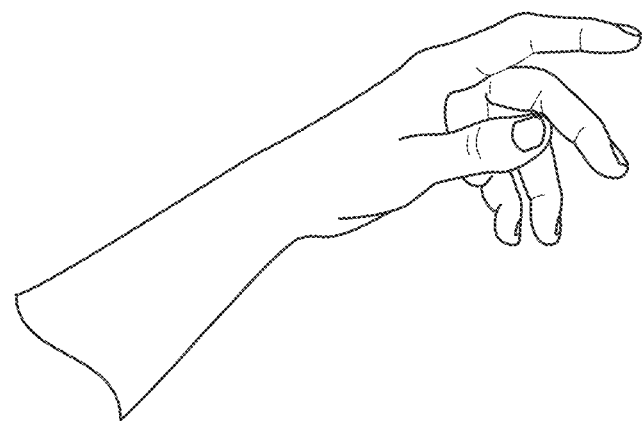
FIG. 8A and FIG. 8B are perspective views of example hand signatures according to various aspects of the invention.
Figure 8B:
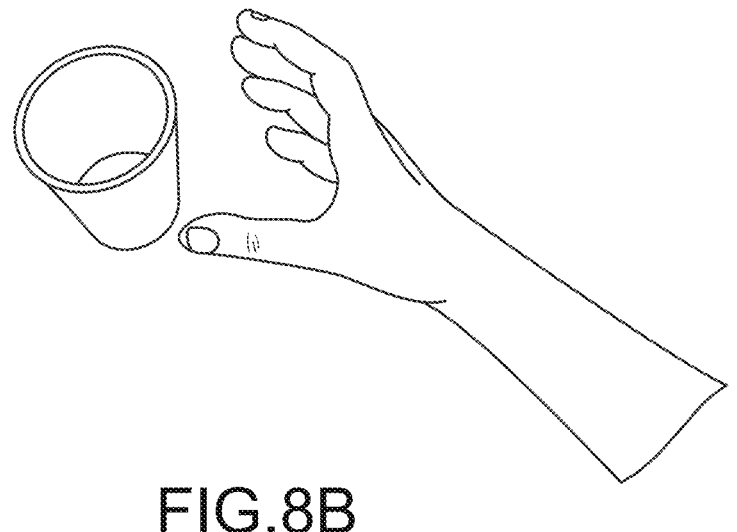

In various aspects, the ECU 606 can use an input sensor 616 that is a camera (e.g., see the camera 216d of FIG. 2) to recognize a hand signature of a vehicle occupant to determine if the vehicle occupant is reach for a cup (e.g., as opposed to reaching for a climate control knob or an audio system knob or any other item in the vehicle). For example, FIG. 8A shows a hand signature with the user's palm facing down and the index finger extended forward, which would typically not be indicative of a user reaching for a cup. In contrast, FIG. 8B shows a hand signature with the user's palm facing horizontally and thumb and fingers generally forming a C-shape, which would typically be indicative of a user reaching for a cup. In various aspects, the hand signature illustrated in FIG. 8B can be a "cup-holding" grip. The ECU 606 can use the input sensor 616 to detect a hand signature that indicates the user is reaching for a cup. In various aspects, the ECU 606 uses the machine learning model to learn hand signatures of different users that indicate the user is reaching for a cup. For example, a confidence level that a user is reaching for a cup may only be 50% based on average user data, but it may be 85% based on historical data of that user.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

What is claimed is:

1. A cup monitoring system that is configured for use with a vehicle, comprising:

an in-cabin sensor configured to monitor an interior of the vehicle;

a vehicle occupant notification apparatus;

an electronic control unit (ECU) having a processor, the ECU is in electronic communication with the in-cabin sensor and the vehicle occupant notification apparatus; and a tangible, non-transitory memory configured to communicate with the processor, the tangible, non-transitory memory having instructions stored thereon that, in response to execution by the processor, cause the ECU to perform operations including:

receiving, by the ECU, sensor data from the in-cabin sensor;

identifying, by the ECU, a first occupant of the vehicle, a second occupant of the vehicle, and a first cup that belongs to the first occupant of the vehicle using the sensor data;

assigning, by the ECU, the first cup to the first occupant of the vehicle;

sending, by the ECU, a notification signal to the vehicle occupant notification apparatus in response to the second occupant of the vehicle reaching for the first cup that belongs to the first occupant of the vehicle; and notifying, by the vehicle occupant notification apparatus, the first occupant or the second occupant.

2. The cup monitoring system of claim 1, wherein the in-cabin sensor includes at least one of a video camera, a radar sensor, a LiDAR sensor, a proximity sensor, or a microphone.

3. The cup monitoring system of claim 2, wherein the ECU assigns the first cup to the first occupant of the vehicle in response to the first occupant of the vehicle taking a drink from the first cup.

4. The cup monitoring system of claim 2, wherein the ECU assigns the first cup to the first occupant of the vehicle based on historical data of the first occupant.

5. The cup monitoring system of claim 2, wherein the vehicle occupant notification apparatus includes at least one of a light, a speaker, a haptic device, a vehicle cluster, or a heads-up display.

6. The cup monitoring system of claim 2, wherein the operations further include: listening, by the ECU, to words spoken by the first occupant of the vehicle that describes a characteristic of the first cup; and recognizing, by the ECU, that the characteristic of the first cup matches the first cup, and the ECU assigns the first cup to the first occupant of the vehicle in response to recognizing that the characteristic of the first cup matches the first cup.

7. The cup monitoring system of claim 1, wherein the operations further include detecting a hand signature of the second occupant of the vehicle to determine that the second occupant of the vehicle is reaching for the first cup.

8. The cup monitoring system of claim 1, wherein the operations further include: sending, by the ECU, the sensor data to a remote server for further processing; and receiving, by the ECU, a list of identified objects from the remote server based on the sensor data, the ECU uses the list of identified objects to assign the first cup to the first occupant of the vehicle.

9. A vehicle comprising:

an in-cabin sensor configured to monitor an interior of the vehicle;

a vehicle occupant notification apparatus;

a cup monitoring system including:

an electronic control unit (ECU) having a processor, the ECU is in electronic communication with the in-cabin sensor and the vehicle occupant notification apparatus, and a tangible, non-transitory memory configured to communicate with the processor, the tangible, non-transitory memory having instructions stored thereon that, in response to execution by the processor, cause the ECU to perform operations including:

receiving, by the ECU, sensor data from the in-cabin sensor;

identifying, by the ECU, a first occupant of the vehicle, a second occupant of the vehicle, and a first cup that belongs to the first occupant of the vehicle using the sensor data;

assigning, by the ECU, the first cup to the first occupant of the vehicle;

sending, by the ECU, a notification signal to the vehicle occupant notification apparatus in response to the second occupant of the vehicle reaching for the first cup that belongs to the first occupant of the vehicle; and notifying, by the vehicle occupant notification apparatus, the first occupant or the second occupant.

10. The vehicle of claim 9, wherein the in-cabin sensor includes at least one of a video camera, a radar sensor, a LiDAR sensor, a proximity sensor, or a microphone.

11. The vehicle of claim 10, wherein the ECU assigns the first cup to the first occupant of the vehicle in response to the first occupant of the vehicle taking a drink from the first cup.

12. The vehicle of claim 10, wherein the ECU assigns the first cup to the first occupant of the vehicle based on historical data of the first occupant.

13. The vehicle of claim 10, wherein the vehicle occupant notification apparatus includes at least one of a light, a speaker, a haptic device, a vehicle cluster, or a heads-up display.

14. The vehicle of claim 10, wherein the operations further include: listening, by the ECU, to words spoken by the first occupant of the vehicle that describes a characteristic of the first cup; and recognizing, by the ECU, that the characteristic of the first cup matches the first cup, and the ECU assigns the first cup to the first occupant of the vehicle in response to recognizing that the characteristic of the first cup matches the first cup.

15. The vehicle of claim 9, wherein the operations further include detecting a hand signature of the second occupant of the vehicle to determine that the second occupant of the vehicle is reaching for the first cup.

16. The vehicle of claim 9, wherein the operations further include: sending, by the ECU, the sensor data to a remote server for further processing; and receiving, by the ECU, a list of identified objects from the remote server based on the sensor data, the ECU uses the list of identified objects to assign the first cup to the first occupant of the vehicle.

17. A method of keeping track of a cup in a vehicle, comprising:

receiving, by a processor, sensor data from an in-cabin sensor;

identifying, by the processor, a first occupant of the vehicle, a second occupant of the vehicle, and a first cup that belongs to the first occupant of the vehicle using the sensor data;

assigning, by the processor, the first cup to the first occupant of the vehicle;

sending, by the processor, a notification signal to a vehicle occupant notification apparatus in response to the second occupant of the vehicle reaching for the first cup that belongs to the first occupant of the vehicle; and notifying, by the vehicle occupant notification apparatus, the first occupant or the second occupant.

18. The method of claim 17, further comprising detecting a hand signature of the second occupant of the vehicle to determine that the second occupant of the vehicle is reaching for the first cup.

19. The method of claim 17, wherein the vehicle occupant notification apparatus includes at least one of a light, a speaker, a haptic device, a vehicle cluster, or a heads-up display.

20. The method of claim 17, further comprising receiving, by the processor, home security sensor data from a home security system, and the processor uses the home security sensor data to assign the first cup to the first occupant of the vehicle.

\* \* \* \* \*